United States Patent [19]
Sleichter, III et al.

[11] Patent Number: 6,087,942
[45] Date of Patent: Jul. 11, 2000

[54] TACTILE ALERT AND MASSAGING SYSTEM

[75] Inventors: Charles G. Sleichter, III, Dana Point; Stanley Cutler, Van Nuys; Gayle B. Gerth, Dana Point, all of Calif.; Alton B. Otis, Jr., Port Townsend, Wash.; Taylor Chau, Cerritos, Calif.

[73] Assignee: JB Research, Inc., Bellflower, Calif.

[21] Appl. No.: 09/081,402

[22] Filed: May 18, 1998

[51] Int. Cl.[7] .................................................. G08B 23/00
[52] U.S. Cl. ............................ 340/576; 340/575; 601/49
[58] Field of Search .................................... 340/575, 576, 340/573.1, 539; 601/49, 86, 87, 91, 90, 97, 98, 101, 150; 600/549

[56] References Cited

U.S. PATENT DOCUMENTS

| | | |
|---|---|---|
| 3,786,628 | 1/1974 | Fossard et al. . |
| 3,938,123 | 2/1976 | Warner . |
| 4,028,882 | 6/1977 | Muncheryan . |
| 4,059,830 | 11/1977 | Threadgill . |
| 4,203,098 | 5/1980 | Muncheryan . |
| 4,326,506 | 4/1982 | Kawabata . |
| 4,354,179 | 10/1982 | Fourcade . |
| 4,380,759 | 4/1983 | Sulkoski et al. . |
| 4,401,971 | 8/1983 | Saito et al. . |
| 4,779,615 | 10/1988 | Frazier . |
| 4,785,280 | 11/1988 | Fubini et al. ............................ 340/576 |
| 5,020,517 | 6/1991 | Foster, Jr. et al. ........................ 128/33 |
| 5,033,864 | 7/1991 | Lasecki et al. ............................ 600/549 |
| 5,076,260 | 12/1991 | Komatsu . |
| 5,089,998 | 2/1992 | Rund . |
| 5,282,181 | 1/1994 | Entner et al. . |
| 5,429,585 | 7/1995 | Liang ........................................ 601/49 |
| 5,437,608 | 8/1995 | Cutler ....................................... 601/49 |
| 5,462,515 | 10/1995 | Tseng ........................................ 601/57 |
| 5,495,242 | 2/1996 | Kick et al. . |
| 5,581,238 | 12/1996 | Chang et al. ............................. 340/573 |
| 5,585,785 | 12/1996 | Gwin et al. ............................... 340/575 |
| 5,684,460 | 11/1997 | Scanlon . |
| 5,686,882 | 11/1997 | Giani . |
| 5,857,986 | 1/1999 | Moriyasu .................................. 601/49 |
| 5,868,687 | 2/1999 | Tedesco .................................... 601/49 |

*Primary Examiner*—Jeffrey A. Hofsass
*Assistant Examiner*—Anh La
*Attorney, Agent, or Firm*—Sheldon & Mak

[57] ABSTRACT

A tactile alert stimulation and massaging system for equipment such as a vehicle includes a pad; a heater element, and motorized vibrators in respective regions of the pad; a plurality of vibratory transducers for location relative to plural zones of the seat, each transducer being responsive to a transducer power signal; a microprocessor controller having program and variable memory and an input and output interface; an array of input elements connected to the input interface for signaling the microprocessor in response to operator input, the signaling including an intensity control value, a plurality of mode signals, and a plurality of region signals relating transducers to be enabled; a driver circuit responsive to the output interface for producing, separately for each of the transducers, the power signal; and the microprocessor controller being operative in response to the input elements for activating the transducers for operation thereof in a plurality of modes including a massaging mode selectively producing activation of the drive signals at adjustable intensity corresponding to the intensity control value for soothingly massaging muscle groups of the driver; and an alert mode producing a predetermined sequence of alert stimulation cycles, each alert stimulation cycle having an idle portion of between 1 second and 30 seconds, and an active portion of sufficient duration, frequency, and intensity for selectively stimulating the muscle groups of the driver thereby to improve the driver's alertness, wherein successive alert stimulation cycles differ in at least one of intensity, frequency, active portion duration, idle portion duration, and transducers enabled.

41 Claims, 8 Drawing Sheets

TACTILE ALERT AND MASSAGING SYSTEM

REFERENCE TO APPENDIX

Attached hereto and incorporated herein is Appendix A, which is the hard copy printout of an assembly listing (Samsung Assembly Language) of the source code for a microcontroller computer program as disclosed herein to implement the invention described herein. Appendix A consists of 90 pages. This assembly listing is subject to copyright protection. The copyright owner has no objection to the facsimile reproduction of the patent disclosure, as it appears in the Patent and Trademark Office patent files or records, but otherwise reserves copyright rights whatsoever.

BACKGROUND

The present invention relates to devices for preventing sleeping or dozing of equipment operators such as vehicle drivers, to massaging devices, and to devices for communicating equipment functional conditions to operators thereof.

Sleep prevention devices are known, being disclosed for example in U.S. Pat. Nos. 3,938,123 to Warner, 4,023,098 to Muncheryan, 4,059,830 to Threadgill, 4,354,179 to Fourcade, and 5,585,785 to Gwin et al. The Warner patent discloses headgear having a battery-powered buzzer that sounds with increasing intensity until the wearer shakes his head. The Muncheryan patent discloses a dash-mountable circuit unit having a rheostat connected in series with battery power and a pair of output jacks, and a toggle switch for selectively disconnecting the power or connecting an interrupter in series with the power. The Threadgill patent discloses electrical contacts that are worn on adjacent fingers and biased toward contact for closing a circuit when the user relaxes, the circuit activating a buzzer or other stimulator for awakening the user. The Fourcade patent discloses an ear prosthesis having an adjustable mercury switch that closes an alarm circuit when the user's head reaches an abnormal inclination. The Gwin et al. patent discloses a force-sensitive transducer that variably feeds a microprocessor, the microprocessor activating an alarm when the force falls below a low limit that is established in an initial period of operation. Also proposed, but not described, is monitoring of transient behavior in a manner used for monitoring steering wheel oscillations. The above devices are unsatisfactory for a number of reasons. For example:

1. The headgear of Warner requires unnatural repetitive head motion to prevent false alarms;
2. The ear prosthesis of Fourcade is ineffective in that sleep can occur in normal head orientations, and false alarms can result from vehicle accelerations;
3. The device of Muncheryan is ineffective for improving or maintaining a driver's alertness in that uniform vibration and regular interruptions of vibratory action promote habituation, the vibratory action being progressively ignored by the user, and it is believed that relaxation by regular massaging of a limited fixed set of muscle groups only at reduced intensity tends to promote drowsiness;
4. The Threadgill device is awkward to use in that the user must actively and continuously force his fingers apart; and
5. The Gwin et al. system is ineffective in that a driver can set an abnormally low threshold by intentionally using very little force during the first 15 seconds of operation;

also, it is believed that there is no enabling disclosure of the use of transients in measured gripping force for detecting drowsiness.

Typical warning systems of the prior art use visual or auditory indications of sensed conditions for initiating appropriate human responses in the nature of corrective action. For example, vehicle fuel gauges are commonly provided with warning lights that are activated when the supply reaches a low threshold, and aircraft have audible warnings of dangerous conditions such as an impending stall at low speed. Visual indications are often ineffective when used alone, in that they might not be noticed. Auditory indications can be ineffective in noisy environments, particularly when the user is hearing-impaired, and they can be objectionable when the indication does not require immediate corrective action.

Recent developments in massaging apparatus have produced a variety of products incorporating plural vibration transducers that operate in multiple modes. However, none is particularly suited for improving or maintaining a driver's alertness as desired for the reasons discussed above.

Thus there is a need for a tactile alert system that overcomes the disadvantages of the prior art, and that is reliable, easy to operate and inexpensive to produce.

SUMMARY

The present invention provides a tactile alert system having an irregular sequence of alert stimulation cycles that are generated using vibratory transducer motors. The motors are embedded in structure supporting a user, such as a vehicle driver's seat. The seat may also contain an embedded heater to enhance the effectiveness of the vibrations. The system, which can be powered from vehicle battery power, can be activated manually or by various signal indications of drowsiness, and it can be configured for interacting with a vehicle electrical system to provide auxiliary status indications and remote control of vehicle functions. In its fullest implementation, the system provides effective massaging of selected muscle groups of the user, and stimulation in response to alarm conditions such as overheating.

In one aspect of the invention, a tactile alert system for an occupant support structure includes a plurality of vibratory transducers for location in plural zones of the support structure; a driver circuit for powering each of the transducers in response to a corresponding drive signal; and a controller responsive to external input for selectively activating the drive signals in a predetermined sequence of alert stimulation cycles of sufficient duration, frequency, and intensity for selectively stimulating muscle groups of an occupant of the structure, successive alert stimulation cycles differing in at least one of intensity, frequency, and transducers activated, thereby to improve the occupant's alertness.

The alert stimulation cycles can each have an active portion, and preferably at least some of the alert stimulation cycles also have an idle portion. The active portion durations can be between 1 second and 15 seconds, the idle portion durations being between 5 seconds and 45 seconds. The stimulation cycles can selectively include a pulse stimulation cycle wherein the controller activates the drive signals in spaced interval portions of the active portions. The interval portions can have an interval duration being between 0.1 second and 1.0 seconds, activated ones of the transducers producing a vibration frequency of between 50 Hz and 70 Hz. The system can include respective left and right transducers in at least some of the zones, the alert stimulation cycles further including at least one stimulation cycle selected from the group consisting of an alternating stimulation cycle wherein the controller alternately activates left and right ones of the transducers, a zigzag stimulation cycle wherein the controller activates alternating left and right ones of the transducers in sequential zones, a wave stimulation cycle wherein the controller activates the transducers in sequential zones, and a random stimulation cycle wherein the controller sequentially activates randomly selected ones of the transducers.

Successive alert stimulation cycles can further differ in at least one of active portion duration and idle portion duration. The active portion duration can be between 1 second and 10 seconds, some of the idle portion durations being between 5 seconds and 15 seconds, others of the idle portion durations being between 15 seconds and 45 seconds. The active portion duration can be approximately 5 seconds, the idle portion durations alternating between approximately 10 seconds and approximately 25 seconds.

The stimulation cycles can include at least one stimulation cycle selected from the group consisting of a pulse stimulation cycle wherein the controller activates the drive signals in spaced interval portions of the active portions, an alternating stimulation cycle wherein the controller alternately activates left and right ones of the transducers, a zigzag stimulation cycle wherein the controller activates alternating left and right ones of the transducers in sequential zones, a wave stimulation cycle wherein the controller activates the transducers in sequential zones, and a random stimulation cycle wherein the controller sequentially activates randomly selected ones of the transducers. The alert stimulation cycles preferably include at least three members of the group for avoiding habituation to the cycles by the user.

The external input can include an alert input selected from the group consisting of a manual actuator input, a bodily function sensor input, a manual control sensor input, and an external system signal. The support structure can include a pad for contacting a portion of the user, the vibratory transducers being imbedded in the pad.

In another aspect of the invention, a tactile alert system for a user support structure includes a vibratory transducer for location in the support structure; the driver circuit for powering the transducer in response to a drive signal; and the controller responsive to external input for selectively activating the drive signal in a predetermined sequence of alert stimulation cycles of sufficient duration, frequency, and intensity for stimulating muscle tissue of a user of the structure thereby to improve the user's alertness, each alert stimulation cycle having an active portion and an idle portion, wherein successive alert stimulation cycles differ in at least one of intensity, frequency, active portion duration, and idle portion duration. The system can further include a radio receiver having an output for communicating the bodily function input in response to a remote bodily function sensor. The system can further include a sensor unit having a carrier having means for attachment to a body member of the user; a transducer supported by the carrier for generating a sensor signal corresponding to a bodily function of the user, the transducer being selected from the group consisting of a blood pulse sensor, a blood pressure sensor, a body temperature sensor, and an EEG sensor; and a radio transmitter supported by the carrier for communicating the sensor signal to the radio receiver.

Preferably the system further includes a plurality of input elements connected to the controller for signaling operator input, the signaling including signals for setting a plurality of operating modes, one of the operating modes being an alert mode incorporating the alert stimulation cycles, and signals for setting an intensity control value, wherein the controller activates the drive signals at maximum intensity during at least a portion of the alert mode, and at adjustable intensity corresponding to the intensity control value in at least one other mode for soothingly massaging the muscle tissue of the user. The support structure can include a pad for contacting a portion of the user, the vibratory transducer being imbedded in the pad.

In a further aspect of the invention, a vehicle tactile alert system for an operator-driven vehicle having a driver's seat includes a plurality of vibratory transducers for location relative to plural zones of the seat, each transducer being responsive to a transducer power signal; a microprocessor controller having program and variable memory and an input and output interface; an array of input elements connected to the input interface for signaling the microprocessor in response to operator input, the signaling including an intensity control value, a plurality of mode signals, and a plurality of region signals relating transducers to be enabled; a driver circuit responsive to the output interface for producing, separately for each of the transducers, the power signal; and the microprocessor controller being operative in response to the input elements for activating the transducers for operation thereof in a plurality of modes including a massaging mode selectively producing activation of the drive signals at adjustable intensity corresponding to the intensity control value for soothingly massaging muscle groups of the driver; and an alert mode producing a predetermined sequence of alert stimulation cycles, each alert stimulation cycle having an idle portion of between 1 second and 30 seconds, and an active portion of sufficient duration, frequency, and intensity for selectively stimulating the muscle groups of the driver thereby to improve the driver's alertness, wherein successive alert stimulation cycles differ in at least one of intensity, frequency, active portion duration, idle portion duration, and transducers enabled.

The active portion durations can be between 1 second and 30 seconds. The system can include respective left and right transducers in at least some of the zones, the alert stimulation cycles including at least three stimulation cycles selected from the group consisting of a pulse stimulation cycle wherein the controller activates the drive signals in spaced interval portions of the active portions, an alternating stimulation cycle wherein the controller alternately activates left and right ones of the transducers, a zigzag stimulation cycle wherein the controller activates alternating left and right ones of the transducers in sequential zones, a wave stimulation cycle wherein the controller activates the transducers in sequential zones, and a random stimulation cycle wherein the controller sequentially activates randomly selected ones of the transducers. The interval portions can have an interval duration being between 0.1 second and 1.0 seconds, activated ones of the transducers producing a vibration frequency of between 50 Hz and 70 Hz.

The input interface can be adapted for receiving an external signal selected from the group consisting of a manual actuator input, a bodily function sensor input, a manual control sensor input, and an external system signal. The external signal can include the manual actuator input, the microprocessor activating the alert mode in response to the manual actuator input. The external signal can include the bodily function input, the microprocessor detecting a predetermined threshold condition of the bodily function input and activating the alert mode in response thereto. The external signal can include the manual control sensor input, the microprocessor activating a predetermined subset of the transducers corresponding to the manual control sensor input. The manual control sensor input can be a hand grip sensor signal, the microprocessor detecting a predetermined threshold condition of the hand grip sensor signal and activating the alert mode in response thereto.

The external signal can include the external system signal, the microprocessor activating a predetermined subset of the transducers corresponding to the external system signal. The external system signal can include a left turn signal and a right turn signal, the microprocessor activating respective left and right ones of the transducers in response to the left and right turn signals. The external system signal can include a quantity signal of the group consisting of a coolant temperature signal, an oil pressure signal, a battery voltage signal, a tire pressure signal, and a fuel quantity signal, the microprocessor detecting a predetermined threshold condition of the external system signal and activating an alarm mode in response thereto, wherein the transducers are activated in a manner sufficiently differing from other modes for the driver to identify occurrence the alarm mode.

The mode signals can include at least two members of a mode signal group consisting of a select signal, a pulse signal, a wave signal, and a zig-zag signal, the microprocessor being operative in response to the signals of the mode signal group, respectively, for correspondingly activating: transducers in enabled zones corresponding to the region signals in a select massaging mode; enabled transducers in spaced intervals of time in a pulse massaging mode; enabled transducers in sequential zones in a wave massaging mode; and alternating left and right ones of the transducers in sequential zones in a zig-zag massaging mode. The signaling can further include a speed input for determining a rate of sequencing mode component intervals, and wherein, during at least one of the massaging modes, the duration of operation in sequential activation of mode segments being responsive to the speed control value.

The input elements can further define a heat control input, the system further including a heater element in the pad; a heater driver responsive to the output interface for powering the heater, the microprocessor being further operative in response to the input elements for activating the heater element, and wherein the composite mode includes activation of the heater element. The driver's seat can include a pad for contacting a portion of the user, the vibratory transducers being imbedded in the pad.

In another aspect of the invention, a method for alerting a vehicle driver includes the steps of:
 (a) providing a plurality of vibratory transducers in plural zones of a driver's seat, a driver circuit connected to the transducers and having respective inputs for receiving corresponding drive signals, and a controller for producing the drive signals, the controller having an alert input;
 (b) activating the alert input;
 (c) operating the controller to produce the drive signals, in response to the alert input, in alert stimulation cycles of sufficient duration, frequency, and intensity for selectively stimulating muscle groups of the driver; and
 (d) sequencing plural cycle segments of the alert stimulation cycles, successive cycles varying in at least one of intensity, frequency, and transducers enabled, thereby to improve the driver's alertness.

The operating step can further include partitioning at least some of the cycle segments into an active portion of between 1 second and 15 seconds, and an idle portion of between 1 second and 15 seconds. The sequencing step can include the further step of varying successive cycle segments in at least one of active portion duration and idle portion duration.

DRAWINGS

These and other features, aspects, and advantages of the present invention will become better understood with reference to the following description, appended claims, and accompanying drawings, where:

Figure 1:
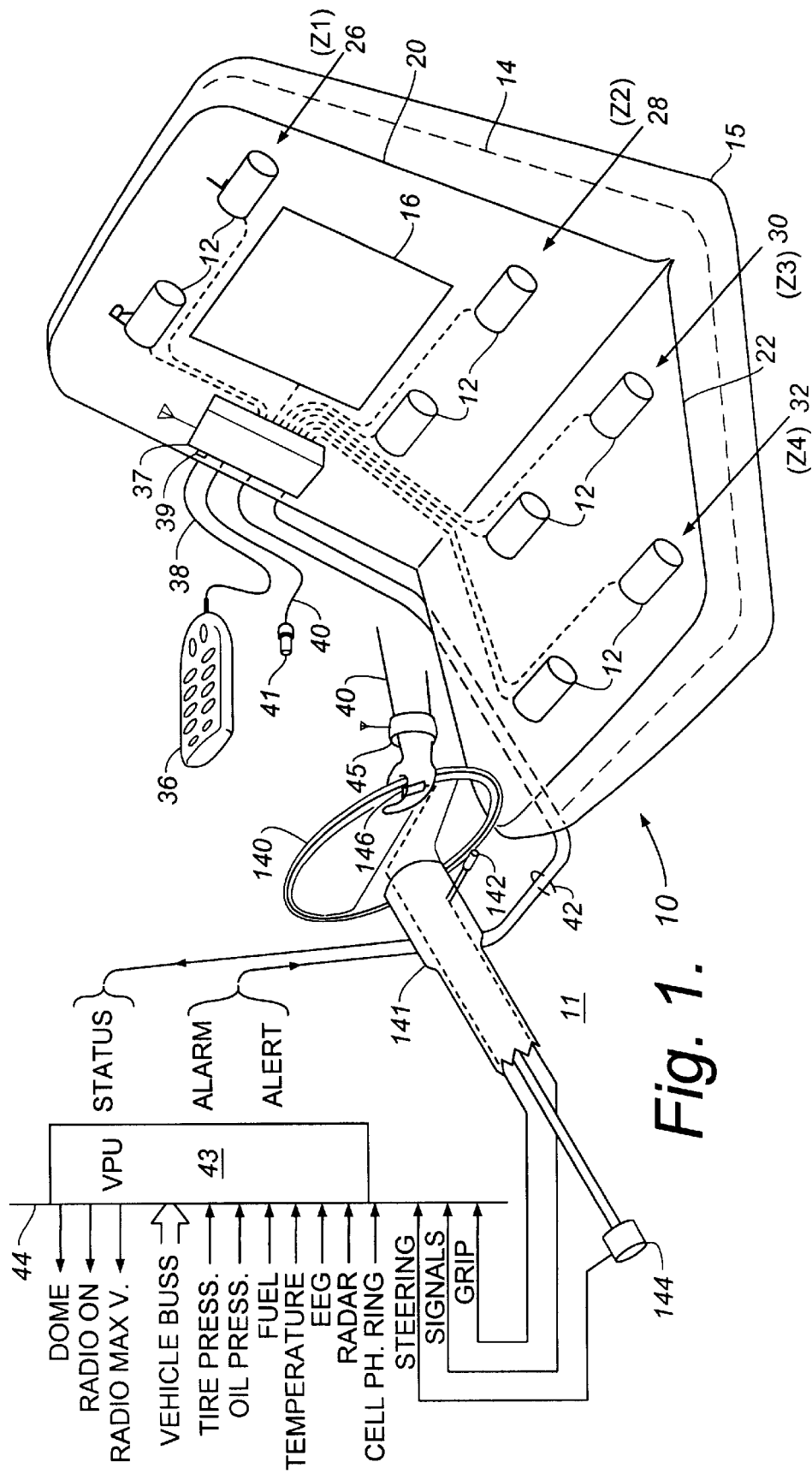
FIG. 1 is a perspective diagrammatic view of a vehicle tactile alert system according to the present invention.
Figure 4A:
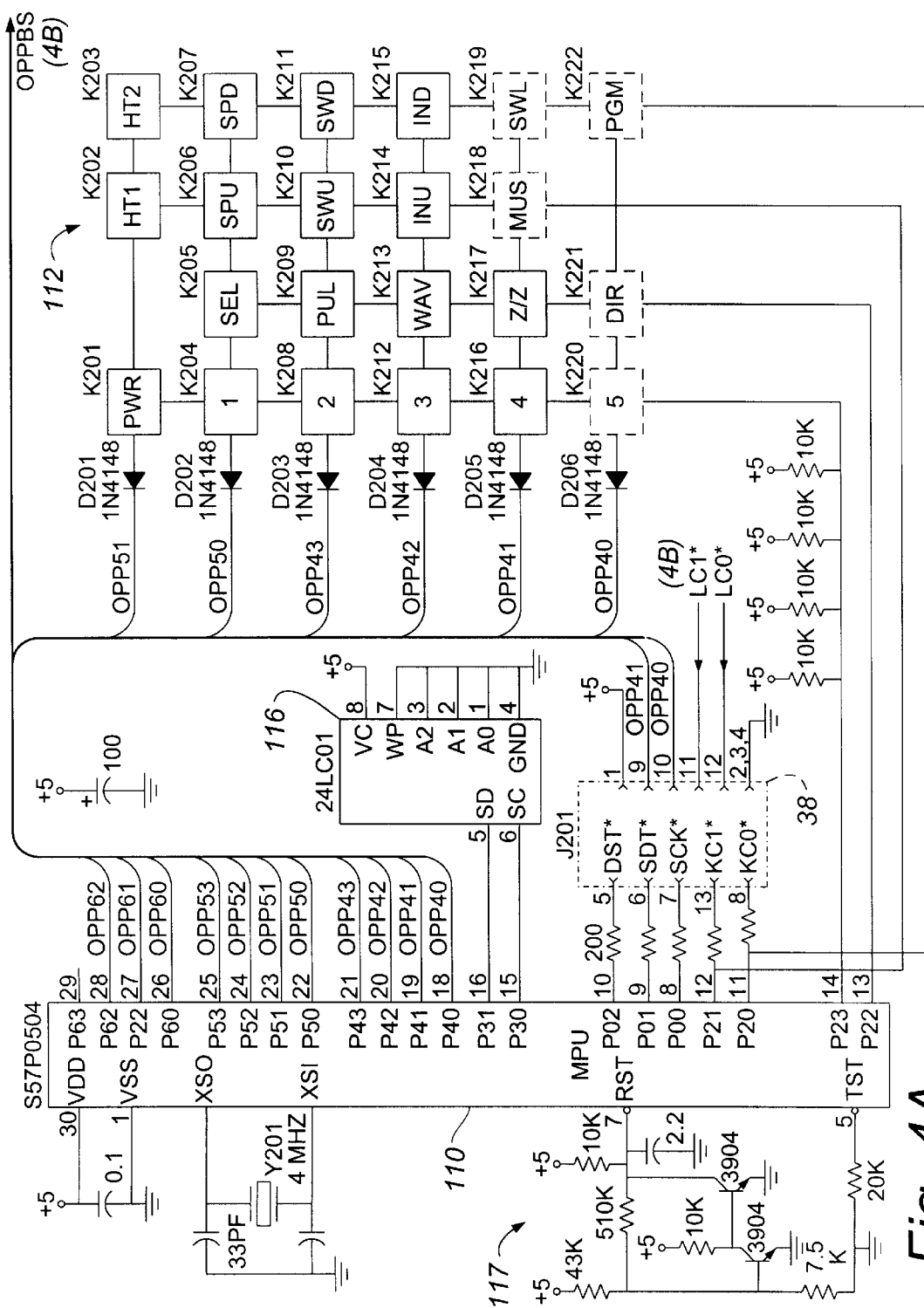
Figure 4B:
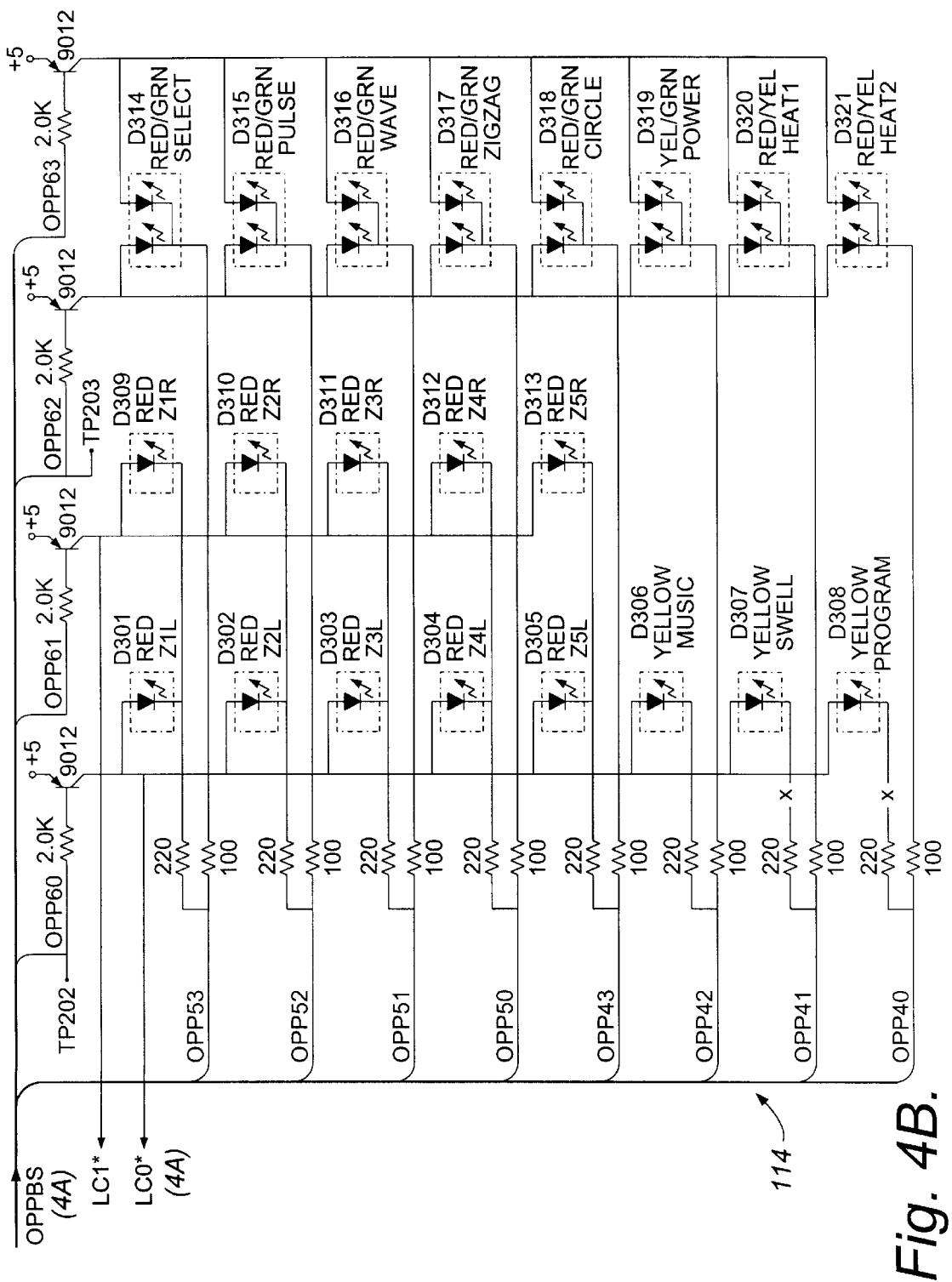
Figure 5A:
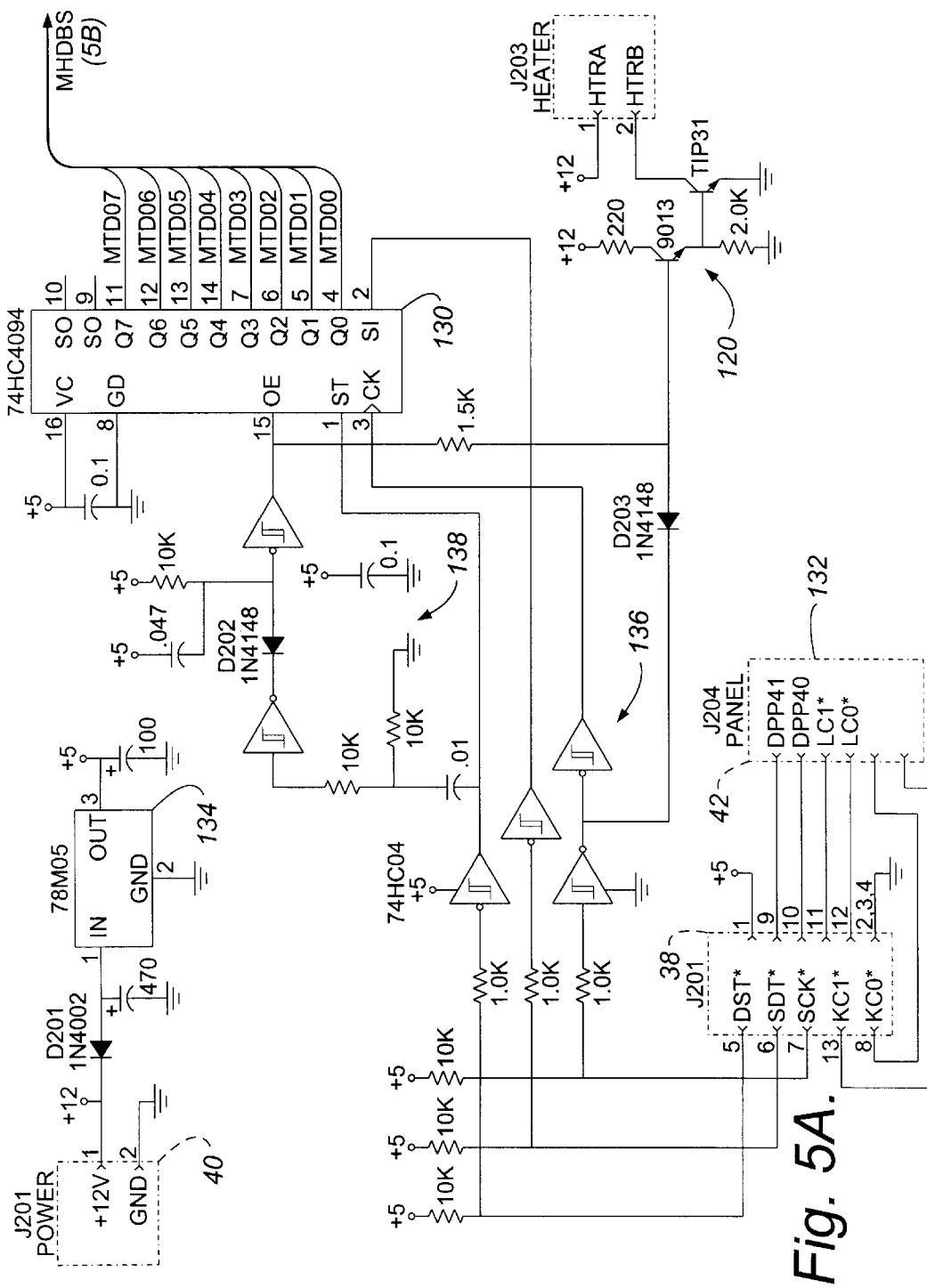
Figure 5B:
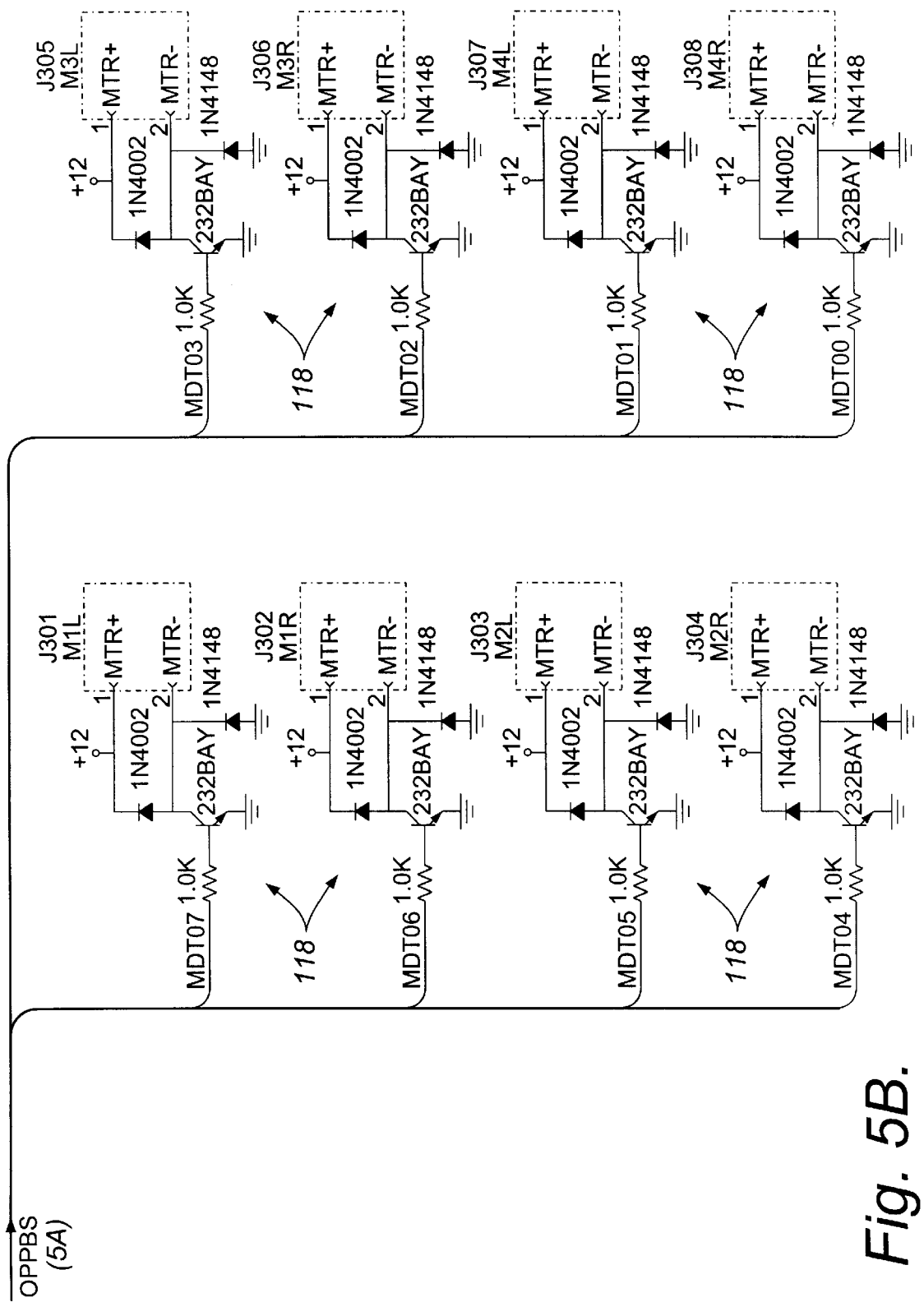
Figure 6:
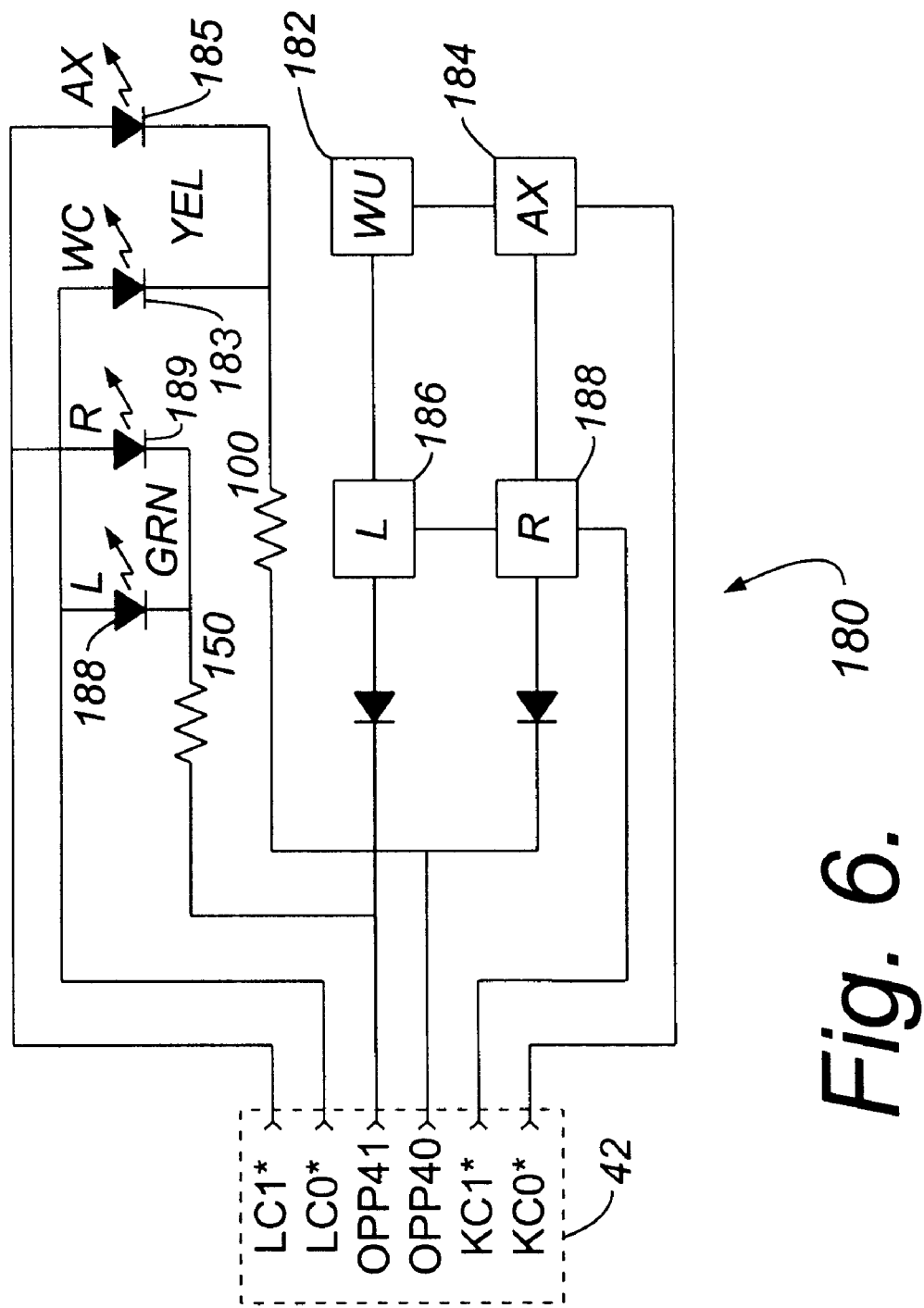

FIG. 4 (presented on separate sheets as FIGS. 4A and 4B) is a circuit diagram detailing the control wand portion in an experimental alternative configuration of the system of FIG. 1;

FIG. 5 (presented on separate sheets as FIGS. 5A and 5B) is a circuit diagram detailing an electronics module portion in the experimental alternative configuration of of the system of FIG. 1; and FIG. 6 is a circuit diagram of a dash panel module for the experimental configuration the wand and electronics modules of FIGS. 4 and 5.

DESCRIPTION

Figure 2:
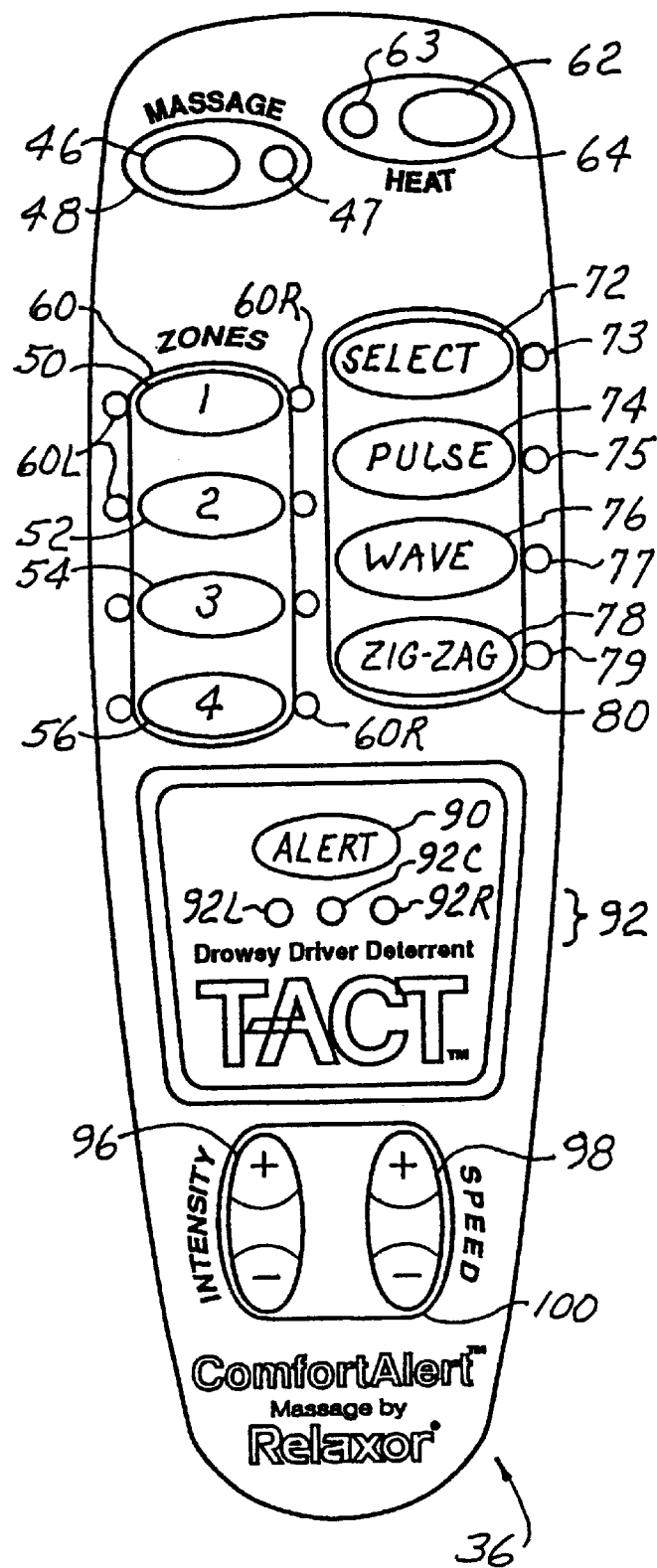
FIG. 2 is an enlarged view of a control wand portion of the system of FIG. 1.
Figure 3:
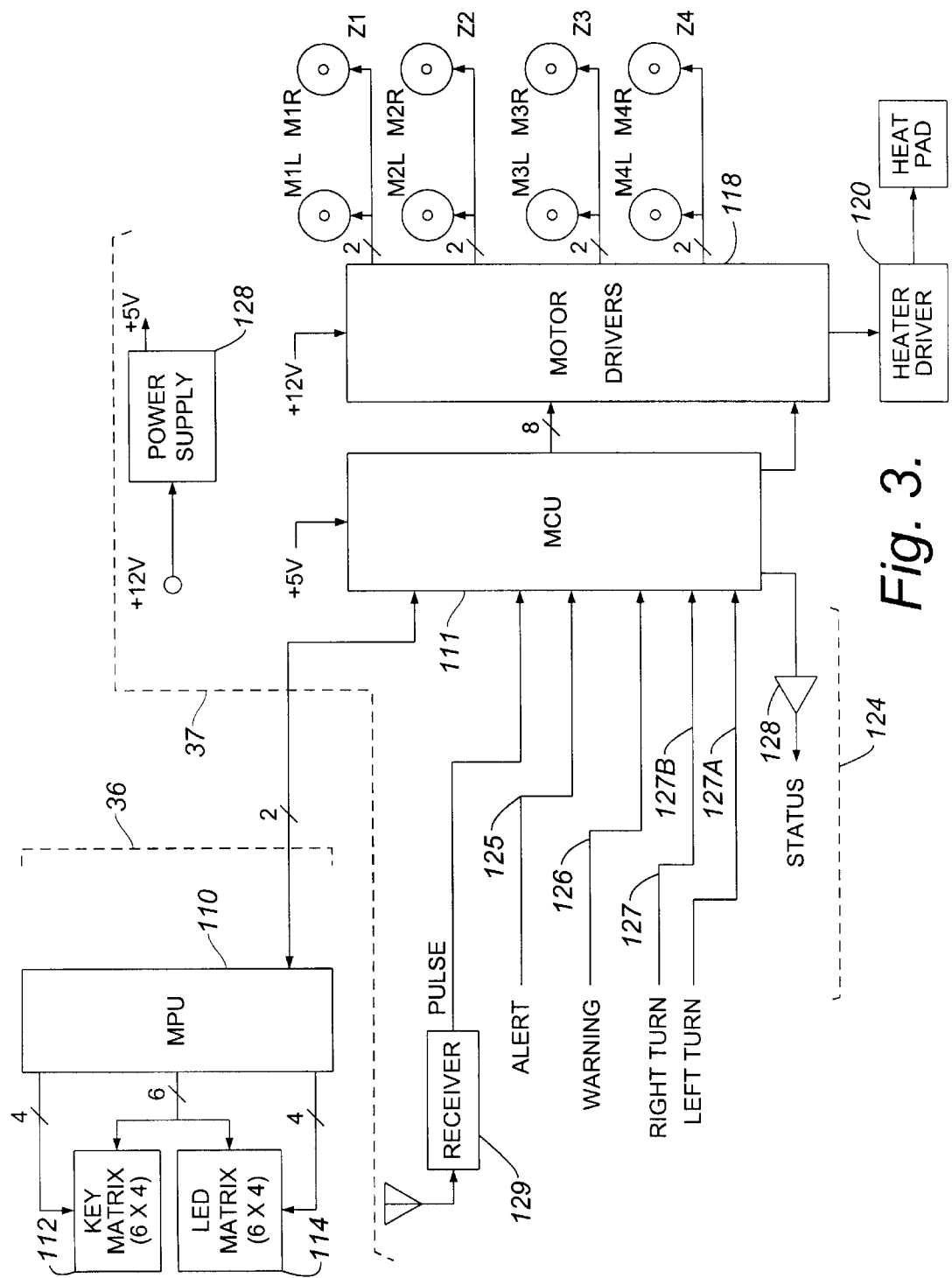
FIG. 3 is a simplified circuit diagram of the system of FIG. 1.

The present invention is directed to a tactile alert system that is particularly effective in enhancing and maintaining alertness of a user that can be the operator of equipment such as a vehicle. The system is also selectively effective for soothingly massaging muscle groups of the user, and silently warning the user of abnormal conditions in the equipment. With reference to FIGS. 1–3 of the drawings, the present invention comprises a microcontroller based tactile alert system 10 that is installed in equipment such as a vehicle 11. The system 10 has a plurality of vibrators 12 that are embedded in a seat pad 14 upon which a user sits. Each vibrator 12 is of conventional construction, and may comprise a small DC motor that rotates an eccentric weight, or if desired, a pair of eccentrics at opposite ends of the motor, the vibrators 12 being sometimes referred to herein as motors. Thus each vibrator 12 is caused to vibrate as the eccentric weight rotates, thereby deforming the pad and coupling the vibrations for stimulating and/or massaging muscle tissue of the user. It will be understood that other forms of vibrators may be used. The pad 14 can be supported on a seat 15 of the vehicle 11 or integrated therewith, and the pad 14 typically has a foam core and a covering of flexible fabric which can be a decorative material such as sheepskin fur. The pad 14 may also contain embedded heaters such as a heater 16 for enhanced stimulation and/or massaging. The pad 14 may be divided into foldable sections such as an upper section 20 (upper and lower back), and a lower section 22 (hips and thighs). It will be understood that the pad 14 can also include a further section for stimulation and/or massaging of the user's calves, the user being depicted in FIG. 1 as a driver 25 of the vehicle 11.

In the exemplary configuration shown in FIG. 1, the pad 14 has eight vibrators 12 arranged in groups of two motors in four zones, as follows: (1) a first zone 26 for the left and right sides of the shoulder area; a second zone 28 for the left and right sides of the lower back; a third zone 30 for the left and right hips; and a fourth zone 32 for the left and right thighs. Particular ones of the zones and/or vibrators 12 are also sometimes referred to herein as Z1L, Z1R, Z2L, Z2R, Z3L, Z3R, Z4L, and Z4R as further indicated in the drawings. Typically, the heater 16 is centrally located in or between the shoulder and lower back areas 26 and 28. It will be understood that other groupings and numbers of zones are contemplated.

The system 10 is activated via a remote control device or wand 36 containing push buttons or keys and visual status indicators, as more fully described below. The wand 36 is removably coupled to an electronics module 37 in the massage pad via a cable 38, such as by a plug and socket coupling 39. The electronics module 37 is electrically connected to the vibrators 12 and the heater 16 by a suitable wiring harness as indicated by dashed lines in FIG. 1. The wand 36 and the massage pad 14 are powered through a power cable 40 having a power plug 41, from a suitable power source such as DC power of the vehicle 11. It will be understood that suitable batteries for operating the system 10 can be located within the pad 14. The control wand 36 provides a variety of functions or modes which are performed through the manipulation of buttons, keys or equivalent means, with corresponding indicators that designate selected functions and modes. The system 10 is operable in response to signals that are communicated by an interface cable 42 from an electrical system of the vehicle 11 as further described below, the electrical system typically including a vehicle microprocessor 43 that is interfaced to an electrical vehicle bus 44. Optionally, the system 10 further includes a sensor unit 45 for wearing by the driver 13, the sensor unit 45 including a radio transmitter for communicating bodily function data such as blood pulse and/or EEG signals to the electronics module 37. For example, the sensor unit 45 can be in the form of a wrist band for carrying and holding a pressure transducer proximate an artery of the driver 13 as shown in FIG. 1.

In some modes of operation, several of the buttons act as double or triple action keys, as further described herein. Specifically, as depicted in FIG. 2, power is turned on or off by a "PWR" button 46 and, when power is supplied, an associated light-emitting diode (LED) 47 is illuminated, the button 46 and the LED 47 being located within an area 48 designated "MASSAGE". The PWR or power button 46 also acts as a double action key for selecting massage duration, and for entering test and demonstration modes that are described below. The four zones 26–32 are individually actuable by pressing corresponding buttons 50, 52, 54, and 56 within a "ZONES" area 60. Visual status indications are provided by respective lights 60L and 60R being disposed adjacent respective buttons or keys 50, 52, 54, and 56 for indicating activation of corresponding left and right ones of the vibrators 12. The heater 16 is operable at two levels by a heat button 62 with corresponding status indications by illumination of an associated LED 63, the button 62 and the LED 63 being within a "HEAT" area 64. The button 62 is a dual action key, sequentially selecting high and low heat levels for the heater 16 as described below.

SELECT, WAVE, PULSE and ZIG-ZAG massaging modes of operation are provided by pressing respective buttons 72, 74, 76, and 78, all enclosed within a modes area 80, SELECT being synonymous with manual operation. The buttons 72, 74, 76 and 78 have respective LEDs 73, 75, 77, and 79 associated therewith for indicating activation if the corresponding modes. "INTENSITY" and "SPEED" adjustments of the massaging modes are provided by the pressing of respective pairs of "+"/"−" switch buttons 96 and 98 within a common area 100. The INTENSITY adjustment relates to the power levels at which the vibratory transducers 12 are driven and, in the case of eccentrically loaded motors also to the frequency of the vibrations. The SPEED adjustment applies to the WAVE, PULSE and ZIG-ZAG modes, and relates to the rate of advancement between mode segments, described below.

According to the present invention, an ALERT stimulative operational mode is provided by pressing an ALERT button 90 and otherwise as described below for enhancing and maintaining a state of alertness of the user by means of a predetermined pattern of vibrations at relatively high intensity. The button 90 has LEDs 92 associated therewith, which may include, for example, a left LED 92L, a center LED 92C, and a right LED 92R. Additionally, an ALARM mode and/or a SIGNAL mode can be implemented in response to signals received on the interface cable 42. The LEDs 60L and 60R are red; the LEDs 73, 75, 77, and 79, are red/green; the LED 47 is yellow/green; and the LED 63 is red/yellow. The operations or effects of the various buttons of the wand 36 are described below.

FUNCTION KEYS

The system 10 is preferably configured for selective implementation of a master set of features and modes of operation, an illustrative and preferred master set being set forth herein. Additional features and modes are described in commonly owned copending application Ser. No. 09/071,357, entitled Microcontroller Based Massage System, that was filed on Apr. 28, 1998, being incorporated herein by this reference. The function keys are in three major groups, namely selector, control, and mode. The selector keys include the power button 46, the heater button 62, and the four zone buttons 50–56. More specifically, the selector keys are used to turn on and off the massage and heater functions and select which massage zones are active.

The control keys include the up/down intensity buttons 90 (labeled "+" and "−"), and the up/down speed buttons 98 (labeled "+" and "−"). These keys are used to control the massage intensity and the operating mode speeds.

The mode keys include the SELECT or manual button 72, the wave button 74, the pulse button 76, and the zig-zag button 78. The mode keys are used to select the current massage operating mode as described further below.

Selector Keys

Regarding the specific selector keys, the power button 46 is a triple action key that cycles massage power through the states of "off", "on for 15 minutes" and "on for 30 minutes". The LED 47 is preferably bi-color for facilitating indication of the current massage power state. When an "on" state is selected, the massage system 10 will automatically turn off after operating for the selected time period. The first operation of the power button 46 after power is connected results in activation of the select mode described below with zone 1 enabled. In subsequent restartings of the system 10 by the power button 46, the system 10 comes on configured as in the most recent usage.

The heater and massage power keys operate independently of each other. The heat button 62 acts as a triple action key for cycling the heater 16 through the states of "off", "on low" and "on high". The LED 63 indicates the "on low" state by yellow, and the "on high" state by red. When an "on" state is selected, the heater 16 will automatically turn off after 30 minutes. The high state is at full power except as limited by a thermostat that is incorporated in the heater. In the low state, full power is applied for a warmup period of approximately 5 minutes, followed by continued operation at reduced power.

The four buttons 50–56 act as dual action keys for enabling and disabling operation of the left and right vibrators 12 in the respective massage zones 26–32. Visual indicators associated with each key are activated when the corresponding zone is enabled. The massage action produced by the enabled motors is determined by the currently selected operating mode.

Control Keys

Regarding the control keys, the intensity buttons 96 are a pair of individually operated or toggled keys that increase and decrease, respectively, the intensity of the massage. Briefly pressing and releasing either key will change the intensity setting to the next step. Pressing and holding either key will continuously change the setting until the key is released or the upper or lower limit is reached. Since the intensity of the massage provides feedback to the user, there are no visual indicators associated with these keys.

The speed buttons 98 are a pair of individually operated or toggled keys increase and decrease, respectively, the speed at which certain of the operating modes change the massage action. Briefly pressing and releasing either key will change the speed setting to the next step. Pressing and holding either key will continuously change the setting until the key is released or the upper or lower limit is reached. Since the speed at which the massage action changes provides feedback to the user, there are no visual indicators associated with these keys.

OPERATION MODES

As indicated above, operation is effected in several modes, including manual, wave, pulse, and zig-zag massaging modes, with further alert, alarm, and signal modes that exercise predetermined aspects of the other modes. In the manual mode, effected by pressing the SELECT button 72, the vibrators 12 in enabled massage zones 26–32 run continuously. Pressing manual button 72 terminates any previous massaging mode. The user may enable and disable the zones using the zone buttons 50–56, and customize the massage action by adjusting the intensity buttons 96. The select LED 73 is activated green. The zone selection is retained during operation of other modes as further described below. This select mode is operative in all implementations of the system 10.

In the wave mode (WAVE button 74), the enabled massage zones 26–32 are cycled sequentially, and the user may enable and disable zones, adjust the massage intensity and adjust the cycling speed. When the wave mode button 74 is operated, the associated visual indicator 75 is activated, and the speed buttons 98 (which are contemplated to be active in all implementations of the system 10) are operative, in addition to the zone buttons 50–56 and the intensity buttons 96, for customizing the massage action. Pressing the wave button 72 also terminates any previous massaging mode. Operation is by sequenced activation of selected zones downwardly from the first zone (26) to the fifth zone (34) and upwardly from the fifth zone (34) to the first zone (26), and repeating. The wave LED 75 is activated green.

In the pulse mode (PULSE button 76), enabled massage zones are simultaneously pulsed on and off. The zone, intensity, and speed keys (buttons 50–56, 96, and 98) may be used to customize the massage action. Pressing the pulse key 76 terminates any previous massaging mode. Operation is by cycling the vibrators 12 in enabled zones on and off at a duty cycle of approximately 50 percent, and at a rate corresponding to the current SPEED setting as defined by operation of the speed toggle buttons 98. The pulse LED 77 is activated green.

In the zig-zag mode (ZIG-ZAG button 80), a "shoelace" pattern sequence of activation of the vibrators 12 to the extent that indicated zones are enabled as described above. More particularly, diagonal pairs of the vibrators 12 are sequentially activated in a repeating pattern such as Z1L and Z2R, Z2R and Z3L, Z3L and Z4R, Z4R and Z5L, followed by Z1R and Z2L, Z2L and Z3R, Z3R and Z4L, Z4L and Z5R. The zig-zag LED 81 is activated green. Alternatively, the zig-zag mode can produce an alternating zig-zag pattern of Z1L, Z2R, Z3L, Z4R and Z5L, followed by Z1R, Z2L, Z3R, Z4L and Z5R, or an alternating pattern in each zone that repeats several (such as four) times in that zone, then moves to next zone.

The user may adjust the massage intensity and the cycling speed, and may also select audio intensity control for each of the above modes.

The alert mode (ALERT button 90) provides a predetermined sequence of alert stimulation cycles at relatively high vibrational intensity. In a preferred exemplary configuration of the system 10, the alert LED 92C is activated yellow, and operation is as follows:

(a) A first alert cycle having an active portion corresponding to the pulse massaging mode, with all zones active at maximum intensity and maximum speed for a duration of approximately 15 seconds, followed by an inactive portion wherein all motors are off, the pulse LED 75 being activated red.

(b) A second alert cycle corresponding to the first alert cycle, but wherein the activation alternates between the left and right ones of the vibrators 12 in respective sub-intervals of the active portion, the pulse LED 75 being activated orange.

(c) A third alert cycle having an active portion corresponding to the zig-zag massaging mode, with all zones active at maximum intensity and maximum speed for a duration sufficient for cycling all zones down and up, approximately 15 seconds, followed by an inactive portion wherein all motors are off, the zig-zag LED 79 being activated red.

(d) A fourth alert cycle having an active portion corresponding to the wave massaging mode, with all zones active at maximum intensity and maximum speed for a duration sufficient for cycling all zones down and up, approximately 15 seconds, followed by an inactive portion wherein all motors are off, the zig-zag LED 79 being activated red.

(e) A fifth alert cycle corresponding to the first alert cycle, but having activation of randomly selected vibrators 12, the pulse LED 75 being activated green.

Another and preferred implementation of the alert mode is as described above, except as follows:

(a) The active portion of the first alert cycle proceeds as described above for a first sub-interval of approximately 4 seconds, then in random groups of two vibrators 12 being activated at the same time for a second subinterval of approximately 7 seconds, followed by a third subinterval corresponding to the first subinterval;

(b) The active portion of the second alert cycle is as described above, except that random pairs of the vibrators 12 are activated in the respective left and right sub-intervals of the cycle;

(c) The active portion of the third alert cycle is as described above, except that the progression among zones is random; and (d) The active portion of the fourth alert cycle has three sub-intervals as described above for the second alert cycle, random ones of the zones being activated in the second sub-interval.

Following the first alert cycle, the other alert cycles can be activated in any order, the alert cycles continuing until the alert mode is terminated as described below. Preferably, successive alert cycles differ in at least one of intensity, frequency, active portion duration, idle portion duration, and transducers enabled. In the alert mode, the zone buttons 50–56, the mode buttons 72, 74, 76, and 78, and the intensity and speed buttons 96 and 98 are inoperative. A further (second) pressing of the alert button 90 causes termination of the alert mode, and restoration of any massaging mode that was active at the onset of the alert mode.

In addition to activation by the ALERT button 90, the system 10 provides for activation by external signals such as a drowsiness signal that can be transmitted by the interface cable 42 from the vehicle microprocessor 43. Alternatively or in addition, a blood pulse signal or other biometric signals can be received as wireless transmissions for activating the alert mode.

The alarm mode provides stimulation of the user that is effective for calling attention to an abnormal condition of the vehicle 10, such as conditions of overheating, low fuel supply, low tire pressure, or potentially dangerous environmental conditions such as the sounding of a siren, railroad crossing alarm, etc., or an incoming radar signal such as might signal a collision course of the vehicle 11. In an exemplary implementation of the alarm mode of the system 10, at least one of the alert LEDs 90 is activated red, and operation is as follows:

(a) A first alarm cycle corresponding to the pulse massaging mode, with all zones active at maximum intensity and maximum speed for a duration of approximately 10 seconds; and (b) A second alarm cycle corresponding to the first alarm cycle, but wherein the activation alternates between the left and right ones of the vibrators 12.

Another and preferred implementation of the alarm mode repeats a single alarm cycle corresponding to the first alarm cycle, but having an active portion and an idle portion, and wherein each portion has a duration of approximately 5 seconds.

The signal mode provides vibratory stimulation that is coordinated with external signals such as operation of left and right turn signals of the vehicle 11. This mode, which can also modify the operation of the massaging and alert modes, is activated by corresponding signals received through the interface cable 42. For example, a left turn submode of the signal mode repetitively activates the left vibrators 12 only, at medium intensity; and a right turn submode of the signal submode repetitively activates the right vibrators 12 only, also at medium intensity.

The alarm and signal modes can be tested without reliance on external signals in a test mode that is entered following a power off condition using a special combination of function keys before operating the PWR key 46. Exemplary key combinations and test sequences are disclosed and described in the above-referenced copending patent application Ser. No. 09/071,357. Similarly, a demonstration (demo) mode provides a continuing sequence that can include all of the massaging, alert, alarm, and signal modes in a manner that is within the skill of the art of a designer also having knowledge of the referenced patent application.

SYSTEM ARCHITECTURE

Referring to FIG. 3, the control architecture of the massage system 10 is based on a microprocessor (MPU) 110, a key matrix 112, and a system status matrix 114 in the wand 36, and a microcontroller (MCU) 111 in the electronics module 37, the MCU 111 being serially interfaced with the MPU 110 through the cable 38. Each of the MPU 110 and the MCU 111 have appropriate crystal clock elements and power-on reset circuitry (not shown). Either or both of the MPU 110 and the MCU 111 can have a serial erasable, electrically programmable memory (EEPROM) associated therewith as described in the above-referenced copending patent application for facilitating programming and configuring same.

Wand

The wand 36 is serially interfaced to the pad 14 for permitting the cable 38 to have only a few conductors, six for example. A suitable device for use as the MPU 110 and/or the MCU 111 is a 4-bit KS57C0004 chip manufactured by Samsung Electronics. As shown in FIG. 3, the MCU 110 is operated at 5-volts being provided from the electronics unit 37, described below. The key matrix 112 has the various (15) buttons of the wand 36 electronically wired in a 6-by-4 matrix that is periodically scanned by the MCU chip 110. Keyboard scanning and LED display generation is performed in a multiplexed fashion that makes optimum use of the available processing time. The scanning algorithm uses leading edge detection with trailing edge filtering or debouncing. This provides rapid response to key pressings and eliminates multiple pressing detection due to slow contact closure or contact bounce. Without this feature, the alternate action selector keys might jitter on and/or off as each key was pressed or released. The scanning algorithm also looks for multiple key pressings and ignores any condition where two or more keys appear simultaneously pressed. This is required to eliminate "phantom key" detection caused by electrical shorting of the rows and columns of the matrix as certain combinations of keys are pressed. This key arrangement and scanning algorithm advantageously reduces the number of MCU inputoutput pins required to detect key pressings. Other key arrangements and scanning algorithms are also usable; however, the matrix approach is the most economical in terms of MCU resources. It will be understood that unused positions of the key matrix 112 are available for additional functions.

The system status matrix 114 contains the various LED power, heater and mode, zone and control indicators 47, 60L, 60R, 63, 73, 75, 77, 79, 90L, 90C, and 90R. As described above, some of the LED indicators are multiple color devices; they have three terminals in the exemplary configuration described herein, each being connected in the matrix 114 as two separate devices. The system status matrix 114 is configured 4-by-6 and driven in a multiplexed fashion by MPU 110, each "column" of 4 LEDs being activated for about 24% of each display cycle. The period of the complete display cycle is short enough so that all activated indicators appear fully illuminated without any noticeable flicker. Flashing of selected indicators is a function performed by the control firmware independent of the display cycle.

The status indicator matrix 114 in combination with associated programming of the MPU advantageously reduces the number of MPU output pins required to illuminate the indicators. To further conserve MCU resources, the ten drive signals of the system status matrix are shared with the key matrix 112. During the 2% of the display cycle when the display is inactive, six of the signals are used to scan the rows of the key matrix. Other visual indicator arrangements and driving algorithms are also possible; however, the matrix approach is the most economical in terms of MPU resources. It will be understood that unused positions of the indicator matrix are available for additional functions.

Electronics Module

As further shown in FIG. 3, the electronics module 37 of the pad 14 includes motor drivers 118 for activating corresponding ones of the vibrators 12 (FIG. 5A), and a heater driver 120 for powering the heater 16 (FIG. 5B), the drivers being responsive to the MCU 111. The operating voltage of the drivers 118 and 120 is nominally 12–14 V DC. The module 37 also includes a 5-volt power regulator 134 (FIG. 5B) for powering the MCU 110 of the wand 36 and the MCU 111 and logic circuitry of the electronics module 37.

Stimulation and massaging intensity (motor speed) is controlled by pulse width modulation (PWM) of the signals applied to the drivers 118. This, in turn, controls the average power applied to each motor. While a duty cycle range of 0–100% is possible, other factors limit the range to about 16–98%. These factors include motor stalling at low speeds, and subjective evaluation of minimum and maximum intensity levels. To reduce the audible noise generated by the PWM process, the pulse rate modulation frequency is set to between approximately 50 Hz and approximately 50 Hz, 55.56 Hz, for example.

The heater driver 120 is configured as a buffered saturated transistor switching circuit. Heat level is controlled by pulse width modulation of the signal applied to the driver in the same manner as for the motor drivers. For high heat, the duty cycle is set to 100%. For low heat, the duty cycle is set to 100% for a warm up interval and then is reduced to 50%. The warm up interval ranges from 0 to 5 minutes depending on the amount of time the heater was previously off. The heating pad 16 contains an integral thermostat that limits the maximum operating temperature. Motor and heater control is performed using pulse width modulation (PWM), a communication occurring each time the on/off state of any driver is to change. This is normally a minimum of two communications per pulse width modulation (PWM) cycle or about 110 per second. The drivers 118 and 120 can include appropriate gating for suppressing activations in case of inactivity of the MCU 111, as described in the above-referenced copending patent application.

PWM Cycle Pairs

All processing is performed synchronously with PWM cycles which have a period of 18,000 μs and a frequency of 55.56 Hz. To reduce processing overhead, keyboard scanning, display driving and ADC data reading is performed over two consecutive PWM cycles. The processing interval for these PWM cycle pairs has a period of 36,000 μs and a frequency of 27.78 Hz. Each PWM cycle is divided into 100 time segments of 180 μs each. All motor and heater state changes occur on a segment boundary. Thus the minimum motor intensity or heater power change is 1% of the maximum value. The time segments are numbered 99 through 0 starting at the beginning of the cycle. The sequence of events over the PWM cycles and pairs thereof can be as described in the above-referenced patent application, except that the MCU 111 is not required to process the scanning of the key and system status matrices 112 and 114. It will be understood that these functions can be combined in a single MCU as disclosed in the above-referenced patent application and that approach was in fact utilized in an experimental prototype of the system 10, described below.

Vehicle Interface

As further shown in FIG. 3, the electronics unit 37 has a vehicle interface 124 for communications between the MCU 111 and the vehicle bus 44 over the interface cable 42. In an exemplary implementation, an ALERT input 125, a warning input 126, and signal inputs 127 including respective LEFT and RIGHT TURN signals 127A and 127B feed separate port lines of the MCU 111, and the MCU 111 feeds a STATUS output signal over the interface cable 42 through a line driver 128. The alert input 125 can be responsive to a dashboard-mounted button or switch (a counterpart of the alert button 90) for manual user control, and/or it can be derived from an automatic determination of a drowsy condition of the driver by the VPU 43 as described below. The unit 37 optionally includes a radio receiver 129 for communicating bodily function signals from the sensor unit 45 to the MCU 111. It will be understood that the radio receiver 129 can instead be associated with the vehicle microprocessor 43, the signals being processed therein and combined with other data as described herein for producing the ALERT signal. The warning input 126 can be responsive to respective FUEL LOW, LOW TIRE, LOW OIL PRESS, OVERHEAT, and COLLISION conditions as signaled to or determined by the VPU 43. The vehicle 11 has appropriate sensors for communicating the above conditions to the VPU 43, such as a radar sensor for sensing an impending collision. Additional inputs to the vehicle bus 44 such as low oil, coolant and/or brake fluid quantity, and low air pressure are also contemplated within the scope of the present invention, the inputs being included in the generation of the warning input 126 by the VPU 43.

As further shown in FIG. 1, the vehicle 11 typically includes a steering wheel 140 on a steering column 141, a turn signal lever 142 projecting from the column for conventionally signaling intended left and right turns. The signal lever 142 is electrically coupled to the vehicle bus 44 for generating the LEFT and RIGHT TURN signals 127A and 127B. The vehicle 11 can also have a steering transducer 144 for communicating movements of the steering wheel 140 to the VPU 43. The VPU 43 can be implemented by known methods for generating the alert input 125 based on differences in patterns of steering behavior of the driver 25 between alert and drowsy conditions. A further optional element is a grip transducer 146 that can be located on the steering wheel 140 in positions that would normally be contacted by the user's hands when the vehicle 11 is being driven, the transducer 146 signaling gripping pressure forces exerted against the steering wheel 140 by the driver 25.

FIRMWARE

Architecture: The ROM firmware of the MPU 110 of the wand 36 is directed to signaling key pressings in the key matrix 112 to the MCU 111, and activating LEDs of the status matrix 114 in response to data received from the MCU 111. This wand firmware may include initialization modules as described in the above-referenced copending patent application, and the initialization data for the MCU 111 can also be temporarily stored in an EPROM of the wand 36. The ROM firmware of the MCU 111 is divided into a set of mainline and timer interrupt modules that are activated during operation of the tactile alert system 10, and may include initialization modules for loading an EPROM associated therewith as described above. The mainline modules have direct control of the stimulation, massage, and heat activations of the system, in response to key pressing signals from the wand 36, and to signals received by the vehicle interface 124, changing the activations as a function of the current operating mode. The timer interrupt modules perform all of the time dependent sense and control tasks requested by the mainline modules plus processing of power, heater, intensity and speed key pressings. The mainline and interrupt modules execute in an interlaced fashion with the latter preempting the former whenever a timer interrupt occurs. Communication between the two is via RAM flags and control words.

Mainline Modules: The names and functions of the mainline modules defined in Appendix A are as follows:

Power-On Initialization (POIN). Executes once following application of main power (battery or AC) to the device to initialize hardware registers, initialize RAM contents, test for an AC or DC power supply, detect activation of the set-up mode, and then start the timer interrupt module for sensing operator input, etc.

Massage Power Resets (MPRS). Initializes the unit into Select Mode with Zone 1 enabled. Executed following POIN and TSMD (described below).

Massage Power Idle (MPID). Executes when the massage power is off to sense key pressings or events that would activate another mode. These include the POWER (key 46), the ZONE 1–4 (keys 50–56), and can include key sequences that enable the POWER key to turn the unit on in test and/or demonstration modes.

Start Primary Operating Mode (STPM). Executes following MPID to branch to a primary mode section of the program.

Wake-up Mode (WUMD). Executes when the unit is in Alert Mode to generate the predetermined sequence of alert stimulation cycles as described above.

Auxiliary Mode (AXMD). Executes when the unit is in alarm mode to generate the predetermined alarm sequence as described above.

Select Mode (SLMD). Executes when the unit is in Select Mode to run the selected zone motors and sense key pressings. The ZONE 1–4 keys toggle the state of the zones and the WAVE, PULSE, ZIG-ZAG, and ALERT keys (keys 74, 76, 78, and 90, respectively) and/or the alert, warning, and signal inputs 125, 126, and 127, transfer execution to the appropriate module. If the radio receiver 129 is implemented, the select mode is also responsive to a flag that is conditionally set based on the time history of the receiver output for activating the alert mode.

Pulse Mode (PLMD). Executes when the unit is in Pulse Mode to pulse the selected zone motors and sense key pressings. The ZONE 1–5 keys toggle the state of the zones and the WAVE, ZIG-ZAG, and ALERT keys (keys 74, 78, and 90, respectively) transfer execution to the appropriate module.

Wave Mode (WVMD). Executes when the unit is in Wave Mode to run the selected zone motors in wave fashion and sense key pressings. The ZONE 1–4 keys toggle the state of the zones and the SELECT, PULSE, ZIG-ZAG and ALERT keys transfer execution to the appropriate module.

Zig-Zag Mode (ZZMD). Executes when the unit is in Zig-Zag Mode to run the selected zig-zag sequence and sense key pressings. The ZONE 1–4 keys transfer to SLMD with the selected zone enabled, and the WAVE, PULSE, SELECT, and ALERT keys transfer to WVMD, PLMD, SLMD, and ALERT, respectively.

Test Mode (TSMD). Executes after the test mode enable key sequence is entered and POWER is pressed. The module resets a demo flag and enters a program sequence that tests the heaters, motors and LEDs by cycling through all implemented combinations of a master set of enabled functions. The test mode skips those functions of the master set that are not implemented, preferably according to parameters previously loaded into electrically programmable memory of the system 10 as described above and more fully in the above-referenced patent application. When the test is complete, the demo flag is tested and the massage transducers and heaters are turned off with execution proceeding at MPRS if the demo flag was zero.

Demonstration Mode (TSMD). After the demonstration mode enable key sequence is entered and POWER is pressed, control is transferred to the TSMD program sequence with the demo flag set, thereby causing the test program sequence to be continuously repeated until the POWER button 46 is again pressed.

The stimulation modes (alert, alarm, and signal), which are implemented generally as described above, supercede the massaging modes, massaging modes that are interrupted by a stimulation mode being resumed when no stimulation mode is active. Also, the signal mode does not necessarily completely supercede an active massaging mode, but preferably modifies that mode.

Experimental Prototype

With further reference to FIGS. 4A, 4B, 5A, 5B, and 6, an experimental prototype of the tactile alert system 10 has been built and operated, the prototype system being a modification of a massaging system as disclosed in the above-referenced copending patent application. In the prototype system 10, there is a single microcomputer chip, an MCU 110 that is in the control wand 36, the MCU 110 being in serial communication with a shift register 130 in the electronics module 37, the shift register being a simplified counterpart of that disclosed in the above-referenced copending application. Thus the wand 36 of the prototype configuration includes simplified counterparts of the key matrix 112, the status matrix 114, a serial EEPROM 116 for facilitating configuration set-up and initializing of the system, and a power reset circuit 117, but with a pair of matrix row lines (OPP40 and OPP41), and a pair of matrix column lines (KC0* and KC1* being tapped into and brought out through the cable 38 for use as described below, the cable 38 being augmented to a total of 13 wires. As shown in FIG. 4A, the MCU 110 is operated at 5-volts, being clocked using a conventional 4 Mhz crystal. The power-on reset circuit 117 has a negative going trip point set to approximately 4.0 V as described in the above-referenced patent application. Certain keys and LEDs of the unmodified system (PGM, SWL, and MUS keys, and PROGRAM and SWEL LEDs) were disabled and others (zone 5, CIR, SWU, SWD and LO keys; and MUSIC and HEAT2 LEDs) were not enabled (by suitably loading the EEPROM 116 as described in the above-referenced pending application).

As shown in FIGS. 5A and 5B, the electronics module 37 of the experimental prototype configuration includes motor drivers 118 for activating corresponding ones of the vibrators 12 (FIG. 5B), a heater driver 120 for powering the heater 16, and a 5-volt power regulator 134 (FIG. 5A) for powering the MCU 110 of the wand 36 and logic circuitry of the electronics module 37. The source power operating voltage is nominally 12–14 V DC, which is typically provided from the electrical system of the vehicle 11.

The SDT* and SCK* signals are data and clock outputs from the MCU serial I/O port of the wand 36. During a byte transfer, the data changes on the negative edge of SCK* and is clocked into the shift register on the positive edge of SCK*. The clock period is 1 μs. The data from the MCU is serially transmitted in negated form. The signal DST* is the data strobe that transfers the shift register data to the output register of the shift register 130, which can be a conventional 74HC4094 integrated circuit). The transfer is enabled while DST* is low. Each update of the shift register 130 consists of transmitting one data byte and then pulsing DST* low for 2 μs. Each negative edge of the DST* triggers a re-triggerable pulse generator of the timer circuit 138 which enables the 74HC4094 output drivers. If the MCU 110 stops updating the shift register, the timer circuit 138 times out, disabling drive signals to the motor and heater drivers 118 and 120. This is a safety feature that protects against unwanted operation in case of MCU failure. As shown in FIG. 5A, the heater driver 120 is driven from the SCK* signal as buffered by the Schmitt trigger circuit 136 and gated by the output of the timer circuit 138. The heater 16 is driven directly from the power source, the driver 120 being configured as a buffered saturated transistor switching circuit. Heat level is controlled by pulse width modulation of the signals applied to the driver as described above.

Motor and heater control is performed using pulse width modulation (PWM) as described above, As shown in FIG. 5A, timer 138 which utilizes a portion of the Schmitt trigger circuit 136 is employed to automatically disable all drivers if a communication is not received at least once every 100 milliseconds. This protects the user in the event the control wand 36 becomes disconnected while power is applied to the electronics module 37. The module 37 also includes a panel connection 132 for extending some of the conductors of the cable 38 to a remote location as described below.

Remote Test Panel

The experimental prototype of the alert system 10 has a remote test panel 180 for simulating functions of the VPU 43 and the vehicle bus 44. The test panel 180, which is coupled to the panel connection 132 by a counterpart of the interface cable 42, includes remotely located portions of the key matrix 112 and the system status matrix 114. More particularly, the test panel 180 includes a counterpart of the alert button 90, designated wake-up (WU) key 182 and having a LED 183 associated therewith, an alarm (AX) key 184 having a LED 185 associated therewith, a left turn (L) key 186 having a LED 187 associated therewith, and a right turn (R) key 188 having a LED 189 associated therewith. The LEDs 188 and 189 are counterparts of the LEDs 92L and 92R of the wand 36 as described above in connection with FIG. 2. The AX key 184 is programmed for simulating the alarm condition, a second press terminating the simulated condition. The above elements are wired to the OPP40*, OPP41*, KC0*, KC1*, LCO*, and LC1* signals from the wand 36 as shown in FIG. 6 to form extensions of the key matrix 112 and the status matrix 114.

Regarding the control programming of the MCU 110, the experimental prototype was programmed for providing the above-described stimulation and massaging modes using a modification of the program listed in Appendix A of the above-referenced copending patent application, the modified program being listed in Appendix A herein. More particularly, the modifications include the following:

The Alert Mode: The alert mode was implemented to be responsive to the WU key 182 with activation of the wake-up LED 183. The five above-described alert stimulation cycles were implemented with the duration of each active portion and each inactive portion being 15 seconds, each active portion being at maximum intensity and speed. A second press deactivates the alert mode, returning the system 10 to a power off condition, or to a previous massaging mode, if the massaging mode was interrupted by the alert mode. It will be understood that in typical implementations, control can be returned to a signal mode that was interrupted by the alert mode, or the alert mode can be temporarily modified by the signal mode.

The Alarm Mode: The alarm mode was implemented to be responsive to the AX key 184, commencing simulation corresponding to the pulse massaging mode and activation of the alarm LED 185, with the four zones 26, 28, 30, and 32 active and at maximum intensity and speed. A second press of the AX key terminates the alarm mode, returning the system to a power off condition. It will be understood that in ordinary implementations, the alarm mode is terminated by absence of an alarm signal, and that control can be returned to a massaging or signal mode that was interrupted by the alarm mode.

The Signal Mode: The signal mode was implemented to be responsive to the L key 186 and the R key 188, commencing simulation corresponding to the pulse massaging mode and activation of the corresponding LED 188 or 189. The appropriate left or right vibrators of the four zones 26, 28, 30, and 32 are activated at a speed of 78 pulses per minute for corresponding to a typical turn signal flashing rate. The intensity is set to approximately 60 percent of the difference between the maximum and minimum intensity limits of the system. Pressing the opposite key during the signal mode switches the activations to the opposite side. In the experimental prototype, a second press of the same key terminates the signal mode, returning the system to the power off condition. It will be understood that in ordinary implementations, the signal mode is terminated by the absence of a signal input 127, and control can be returned to a previously interrupted massaging mode.

Thus it is believed that the system 10 of the present invention is effective for both improving and maintaining an alertness state of the driver 25, as well as for calling attention to alarm and signal conditions without requiring visual or aural stimulation of the driver. Thus the present invention provides an effective and low cost remedy for alleviating conditions of drowsiness and/or inattention of vehicle and other equipment operators. Suitable vehicles for which the system 10 is appropriate include automobiles, aircraft, trucks, and ships, as well as tractors and other heavy equipment and agri-machinery.

Although the present invention has been described in considerable detail with reference to certain preferred versions thereof, other versions are possible. For example, other types of transducers, including force and displacement actuators, can be used for deforming the massage pad 14. Therefore, the spirit and scope of the appended claims should not necessarily be limited to the description of the preferred versions contained herein.

What is claimed is:

1. A tactile alert system for an occupant support structure, comprising:
    (a) a plurality of vibratory transducers for location in plural zones of the support structure;
    (b) a driver circuit for powering each of the transducers in response to a corresponding drive signal; and
    (c) a controller responsive to external conditions for selectively activating the drive signals in a predetermined sequence of alert stimulation cycles of sufficient duration, frequency, and intensity for selectively stimulating muscle groups of an occupant of the structure, successive alert stimulation cycles differing in at least one of intensity, frequency, and transducers activated, thereby to alert the occupant of the particular condition and to improve the occupant's alertness.

2. The tactile alert system of claim 1, wherein the alert stimulation cycles each have an active portion and at least some of the alert stimulation cycles have an idle portion.

3. The tactile alert system of claim 2, wherein the active portion durations are between 1 second and 15 seconds, and the idle portion durations are between 5 seconds and 45 seconds.

4. The tactile alert system of claim 2, wherein the stimulation cycles selectively include a pulse stimulation cycle wherein the controller activates the drive signals in spaced interval portions of the active portions.

5. The tactile alert system of claim 4, wherein the interval portions have an interval duration being between 0.1 second and 1.0 seconds, activated ones of the transducers producing a vibration frequency of between 50 Hz and 70 Hz.

6. The tactile alert system of claim 4, comprising respective left and right transducers in at least some of the zones, and wherein the alert stimulation cycles further include at least one stimulation cycle selected from the group consisting of an alternating stimulation cycle wherein the controller alternately activates left and right ones of the transducers, a zigzag stimulation cycle wherein the controller activates alternating left and right ones of the transducers in sequential zones, a wave stimulation cycle wherein the controller activates the transducers in sequential zones, and a random stimulation cycle wherein the controller sequentially activates randomly selected ones of the transducers.

7. The tactile alert system of claim 2, wherein successive alert stimulation cycles further differ in at least one of active portion duration and idle portion duration.

8. The tactile alert system of claim 7, wherein the active portion duration is between 1 second and 10 seconds, and some of the idle portion durations are between 5 seconds and 15 seconds, others of the idle portion durations being between 15 seconds and 45 seconds.

9. The tactile alert system of claim 8, wherein the active portion duration is approximately 5 seconds, the idle portion durations alternating between approximately 10 seconds and approximately 25 seconds.

10. The tactile alert system of claim 1, comprising respective left and right transducers in at least some of the zones, and wherein the stimulation cycles include at least one stimulation cycle selected from the group consisting of a pulse stimulation cycle wherein the controller activates the drive signals in spaced interval portions of the active portions, an alternating stimulation cycle wherein the controller alternately activates left and right ones of the transducers, a zigzag stimulation cycle wherein the controller activates alternating left and right ones of the transducers in sequential zones, a wave stimulation cycle wherein the controller activates the transducers in sequential zones, and a random stimulation cycle wherein the controller sequentially activates randomly selected ones of the transducers.

11. The tactile alert system of claim 10, wherein the alert stimulation cycles include at least three members of the group.

12. The tactile alert system of claim 1, wherein the external conditions includes an alert input selected from the group consisting of a manual actuator input, a bodily function sensor input, a manual control sensor input, and an external system signal.

13. The tactile alert system of claim 1, wherein the support structure includes a pad for contacting a portion of the user, the vibratory transducers being imbedded in the pad.

14. A tactile alert system for a user support structure, comprising:
(a) a vibratory transducer for location in the support structure;
(b) a driver circuit for powering the transducer in response to a drive signal; and
(c) a controller responsive to external conditions for selectively activating the drive signal in a predetermined sequence of alert stimulation cycles of sufficient duration, frequency, and intensity for stimulating muscle tissue of a user of the structure thereby to alert the user of the particular condition and to improve the user's alertness, each alert stimulation cycle having an active portion and an idle portion, wherein successive alert stimulation cycles differ in at least one of intensity, frequency, active portion duration, and idle portion duration.

15. The tactile alert system of claim 14, wherein the active portion durations are between 1 second and 15 seconds, and the idle portion durations are between 5 seconds and 45 seconds.

16. The tactile alert system of claim 14, wherein the external conditions includes an alert input selected from the group consisting of a manual actuator input, a bodily function input, a manual control sensor input, and an external system signal.

17. The tactile alert system of claim 16, further comprising a radio receiver having an output for communicating the bodily function input in response to a remote bodily function sensor.

18. The tactile alert system of claim 17, further comprising a sensor unit including:
(a) a carrier having means for attachment to a body member of the user;
(b) a transducer supported by the carrier for generating a sensor signal corresponding to a bodily function of the user, the transducer being selected from the group consisting of a blood pulse sensor, a blood pressure sensor, a body temperature sensor, and an EEG sensor; and
(c) a radio transmitter supported by the carrier for communicating the sensor signal to the radio receiver.

19. The tactile alert system of claim 14, further comprising a plurality of input elements connected to the controller for signaling operator input, the signaling including signals for setting a plurality of massaging modes and signals for setting an intensity control value, the system also having an alert mode incorporating the alert stimulation cycles, and signals for setting an intensity control value, wherein the controller activates the drive signals at maximum intensity during at least a portion of the alert mode, and at adjustable intensity corresponding to the intensity control value in at least one of the massaging modes for soothingly massaging the muscle tissue of the user, the alert mode operating independently of the intensity control value.

20. The tactile alert system of claim 14, wherein the support structure includes a pad for contacting a portion of the user, the vibratory transducer being imbedded in the pad.

21. The system of claim 19, wherein the input elements further include an alert element for initiating the alert mode by user input.

22. A vehicle tactile alert system for an operator-driven vehicle having a driver's seat, the system comprising:
(a) a plurality of vibratory transducers for location relative to plural zones of the seat, each transducer being responsive to a transducer power signal;
(b) a microprocessor controller having program and variable memory and an input and output interface;
(c) an array of input elements connected to the input interface for signaling the microprocessor in response to operator input, the signaling including an intensity control value, a plurality of mode signals, and a plurality of region signals relating transducers to be enabled;
(d) a driver circuit responsive to the output interface for producing, separately for each of the transducers, the power signal; and (e) the microprocessor controller being operative for activating the transducers for operation thereof in a plurality of modes including:
  (i) a massaging mode selectively producing activation of the drive signals in response to the input elements at adjustable intensity corresponding to the intensity control value for soothingly massaging muscle groups of the driver; and
  (ii) an alert mode producing a predetermined sequence of alert stimulation cycles in response to external input and independently of the intensity control value, each alert stimulation cycle having an idle portion of between 1 second and 30 seconds, and an active portion of sufficient duration, frequency, and intensity for selectively stimulating the muscle groups of the driver thereby to improve the driver's alertness, wherein successive alert stimulation cycles differ in at least one of intensity, frequency, active portion duration, idle portion duration, and transducers enabled.

23. The tactile alert system of claim 22, wherein the active portion durations are between 1 second and 30 seconds.

24. The tactile alert system of claim 22, comprising respective left and right transducers in at least some of the zones, and wherein the alert stimulation cycles include at least three stimulation cycles selected from the group consisting of a pulse stimulation cycle wherein the controller activates the drive signals in spaced interval portions of the active portions, an alternating stimulation cycle wherein the controller alternately activates left and right ones of the transducers, a zigzag stimulation cycle wherein the controller activates alternating left and right ones of the transducers in sequential zones, a wave stimulation cycle wherein the controller activates the transducers in sequential zones, and a random stimulation cycle wherein the controller sequentially activates randomly selected ones of the transducers.

25. The tactile alert system of claim 24, wherein the interval portions have an interval duration being between 0.1 second and 1.0 seconds, activated ones of the transducers producing a vibration frequency of between 50 Hz and 70 Hz.

26. The tactile alert system of claim 22, wherein the external input comprises an external signal selected from the group consisting of a bodily function sensor input, a manual control sensor input, and an external system signal.

27. The tactile alert system of claim 26, wherein the external input further comprises a manual actuator input, the microprocessor activating the alert mode in response to the manual actuator input.

28. The tactile alert system of claim 26, wherein the external signal includes the bodily function input, the microprocessor detecting a predetermined threshold condition of the bodily function input and activating the alert mode in response thereto.

29. The tactile alert system of claim 26, wherein the external signal includes the manual control sensor input, and the microprocessor activates a predetermined subset of the transducers corresponding to the manual control sensor input.

30. The tactile alert system of claim 29, wherein the manual control sensor input is a hand grip sensor signal, the microprocessor detecting a predetermined threshold condition of the hand grip sensor signal and activating the alert mode in response thereto.

31. The tactile alert system of claim 26, wherein the external signal includes the external system signal, and the microprocessor activates a predetermined subset of the transducers corresponding to the external system signal.

32. The tactile alert system of claim 31, wherein the external system signal includes a left turn signal and a right turn signal, the microprocessor activating respective left and right ones of the transducers in response to the left and right turn signals.

33. The tactile alert system of claim 31, wherein the external system signal includes a quantity signal of the group consisting of a coolant temperature signal, an oil pressure signal, a battery voltage signal, a tire pressure signal, and a fuel quantity signal, the microprocessor detecting a predetermined threshold condition of the external system signal and activating an alarm mode in response thereto, wherein the transducers are activated in a manner sufficiently differing from other modes for the driver to identify occurrence the alarm mode.

34. The tactile alert system of claim 22, wherein the mode signals include at least two members of a mode signal group consisting of a select signal, a pulse signal, a wave signal, and a zig-zag signal, the microprocessor being operative in response to the signals of the mode signal group, respectively, for correspondingly activating:
  (a) transducers in enabled zones corresponding to the region signals in a select massaging mode;
  (b) enabled transducers in spaced intervals of time in a pulse massaging mode;
  (c) enabled transducers in sequential zones in a wave massaging mode; and
  (d) alternating left and right ones of the transducers in sequential zones in a zig-zag massaging mode.

35. The tactile alert system of claim 34, wherein the signaling further includes a speed input for determining a rate of sequencing mode component intervals, and wherein, during at least one of the massaging modes, the duration of operation in sequential activation of mode segments is responsive to the speed control value.

36. The tactile alert system of claim 22, wherein the input elements further define a heat control input, the system further comprising:
  (a) a heater element in the pad;
  (b) a heater driver responsive to the output interface for powering the heater,
  the microprocessor being further operative in response to the input elements for activating the heater element, and
  wherein the composite mode includes activation of the heater element.

37. The tactile alert system of claim 22, wherein the driver's seat includes a pad for contacting a portion of the user, the vibratory transducers being imbedded in the pad.

38. A method for alerting a vehicle driver, comprising the steps of:
  (a) providing a plurality of vibratory transducers in plural zones of a driver's seat, a driver circuit connected to the transducers and having respective inputs for receiving corresponding drive signals, and a controller for producing the drive signals, the controller having an alert input;
  (b) activating the alert condition input;
  (c) operating the controller to produce the drive signals, in response to the alert input, in alert stimulation cycles of sufficient duration, frequency, and intensity for selectively stimulating muscle groups of the driver; and (d) sequencing plural cycle segments of the alert stimulation cycles, successive cycles varying in at least one of intensity, frequency, and transducers enabled, thereby to alert the driver of the particular condition input and to improve the driver's alertness.

39. The method of claim 38, wherein the operating step further comprises partitioning at least some of the cycle segments into an active portion of between 1 second and 15 seconds, and an idle portion of between 1 second and 15 seconds.

40. The method of claim 38, wherein the sequencing step comprises the further step of varying successive cycle segments in at least one of active portion duration and idle portion duration.

41. The method of claim 38, further comprising operating the controller in a massaging mode wherein the drive signals are activated in response to driver input at adjustable intensity for soothingly massaging muscle tissue of the driver, and interrupting the massaging mode in response to the activating of the alert input.

* * * * *